(12) United States Patent
Viaud

(10) Patent No.: US 6,463,714 B2
(45) Date of Patent: Oct. 15, 2002

(54) INTEGRATED BALER AND BALE WRAPPING DEVICE

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 55 days.

(21) Appl. No.: 09/730,161

(22) Filed: Dec. 4, 2000

(65) Prior Publication Data

US 2001/0003236 A1 Jun. 14, 2001

(30) Foreign Application Priority Data

Dec. 10, 1999 (DE) .......................... 199 59 574

(51) Int. Cl.⁷ .......................... B65B 63/04; A01F 15/07
(52) U.S. Cl. .............................. 53/118; 53/589; 100/89
(58) Field of Search ................... 53/118, 211, 587–589; 100/87–89

(56) References Cited

U.S. PATENT DOCUMENTS

| | | | |
|---|---|---|---|
| 1,733,434 A | * 10/1929 | Taft | 100/89 |
| 4,703,605 A | 11/1987 | Ackermann | 53/118 |
| 5,802,805 A | 9/1998 | Oiestad | 53/118 |

FOREIGN PATENT DOCUMENTS

DE 38 05 224 A1 8/1989

OTHER PUBLICATIONS

PCT WO 97/18699, dated May 29, 1997.
WO 99/04613, World Intellectual Property Organization, dated Feb. 14, 1999.
WO 00/36903, World Intellectual Property Organization, dated Jun. 29, 2000.

* cited by examiner

Primary Examiner—Stephen F. Gerrity

(57) ABSTRACT

An integrated large round baler and wrapping device has a baling chamber defined by separate upper and lower housing sections, which meet at a substantially horizontal plane. The upper housing section is mounted for being elevated and guided vertically relative to the lower housing section such that a gap of substantially equal height is formed between the bottom of the upper housing section and the horizontal plane. A bale wrapping arrangement is provided for wrapping, with plastic foil or sheet or the like, the entire surface a bale located the baling chamber when the upper housing section is elevated. The lower housing section includes a bale-supporting roller section which is mounted for downward movement so as to discharge a wrapped bale.

7 Claims, 3 Drawing Sheets

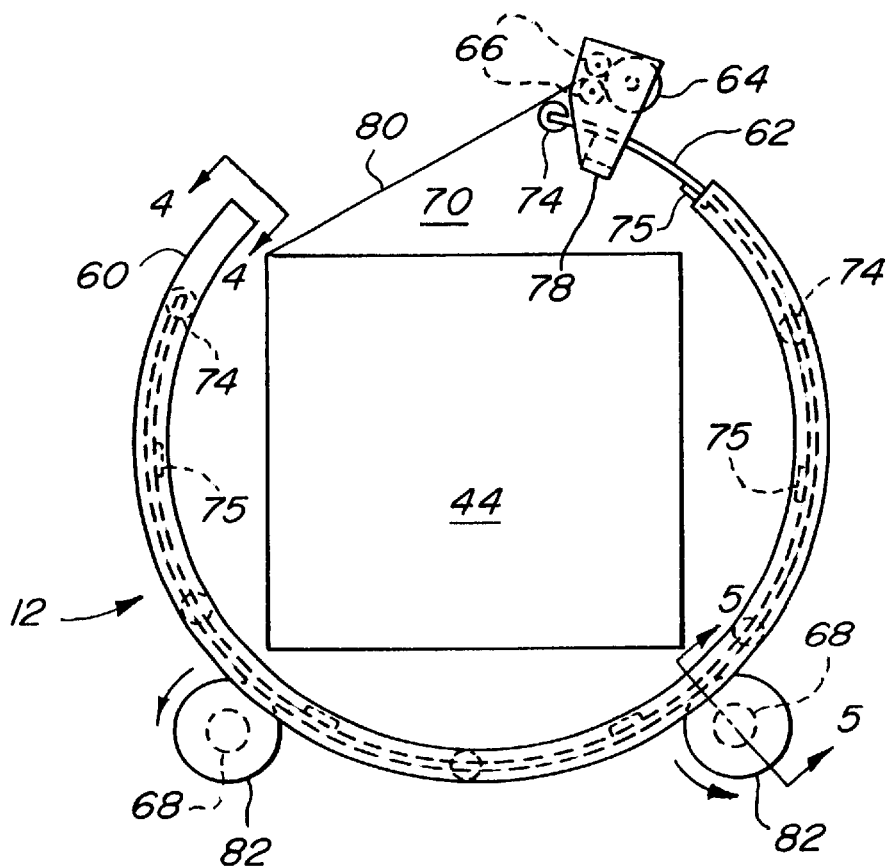
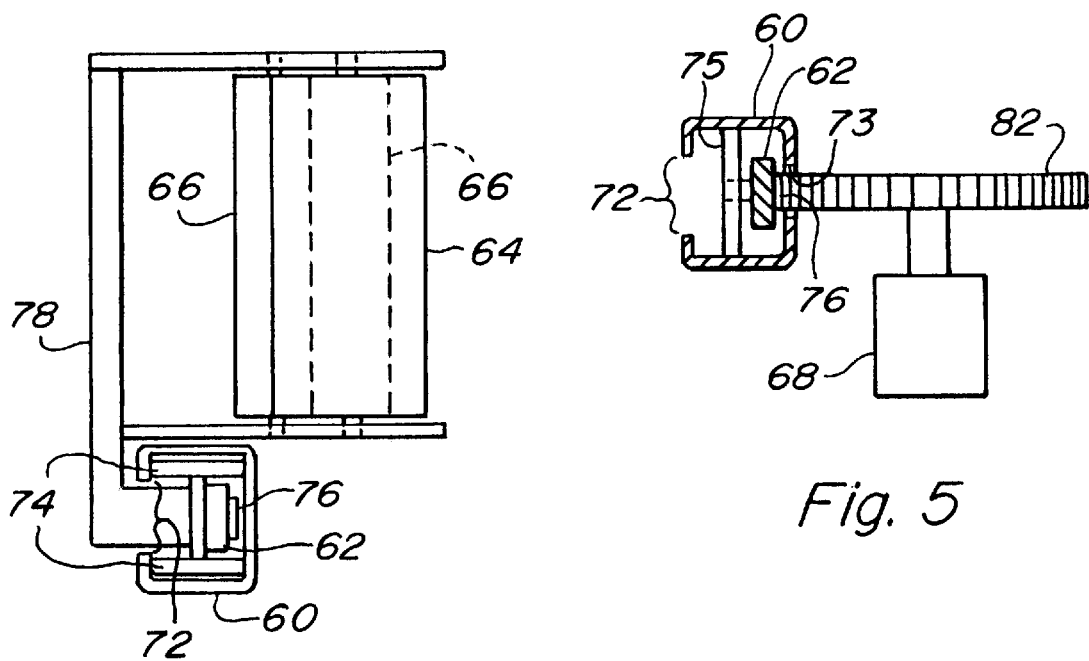

US 6,463,714 B2

INTEGRATED BALER AND BALE WRAPPING DEVICE

The invention concerns an integrated baler and bale wrapping device with a frame and a baling chamber that is surrounded on its circumference by an upper and a lower housing section.

BACKGROUND OF THE INVENTION

From WO-A-97118699 an integrated large round baler and wrapping device is known whose baling chamber is surrounded by an upper and a lower housing section. The upper housing section is connected in a bearing with the forward region of the frame, free to pivot, and can be moved vertically by means of a hydraulic cylinder. A wrapping arm is attached to the lower housing section and can be pivoted about a vertical axis and can wrap a bale as soon as the upper housing section is pivoted upward.

DE-38 05 224 shows an integrated large round baler and wrapping device with an upper and a lower housing section where the upper housing section is carried on a frame so that it can be moved vertically by means of hydraulic cylinders. A wrapping arm is mounted to a tall overhead frame for revolving about a vertical axis so as to wrap a bale as soon as the upper housing section is raised vertically.

The problem underlying the invention is seen in the fact that the upper housing section when fully pivoted on a large round baler with the frame and the hydraulic cylinder, as disclosed in the first-mentioned prior art device, and the fixed tall frame, as disclosed in the second-mentioned prior art device, result in a tall configuration that can lead to overturning of the baler, in particular during operation on a slope.

SUMMARY OF THE INVENTION

According to the present invention there is provided an improved large round baler constructed in combination with a bale wrapper which functions to wrap the entire surface of the bale while the bale is still located in the baling chamber.

A broad object of the invention is to provide an integrated large round baler and bale wrapping device which maintains a stable configuration during baling and wrapping of the bale.

A more specific object of the invention is to provide an integrated baler and wrapping device, as set forth in the preceding object, wherein an upper part of the baling chamber is mounted for vertical movement through means of a four-bar linkage whereby an upper part of the baling chamber may be lifted sufficiently to permit the enclosed bale to be wrapped without the upper part of the baling chamber extending unduly high into the air.

Yet another object of the invention is to provide an integrated baler and wrapping device, as set forth in the immediately preceding object, wherein the lower part of the baling chamber includes a section which may be lowered to a discharge position allowing the wrapped bale to fall onto the ground.

These and other objects will become apparent from a reading of the ensuing description together with the appended drawings.

BRIEF DESCRIPTION OF THE DRAWINGS

FIG. 3 somewhat schematic top view of the bale wrapping device.

FIG. 4 is a view taken along line 4—4 of FIG. 3, but showing that end of the slide member which carries the wrap material dispensing roll assembly just as the assembly emerges from the right, rear end of the ring-like guide member for the slide member. FIG. 5 is a vertical sectional view taken along line 5—5 of FIG. 3, but showing the ring-like slide member in a position wherein a vertical support roller of the slide device is located on a radial line of the slide member passing through the center of the slide member drive motor.

DESCRIPTION OF THE PREFERRED EMBODIMENT

Figure 1:
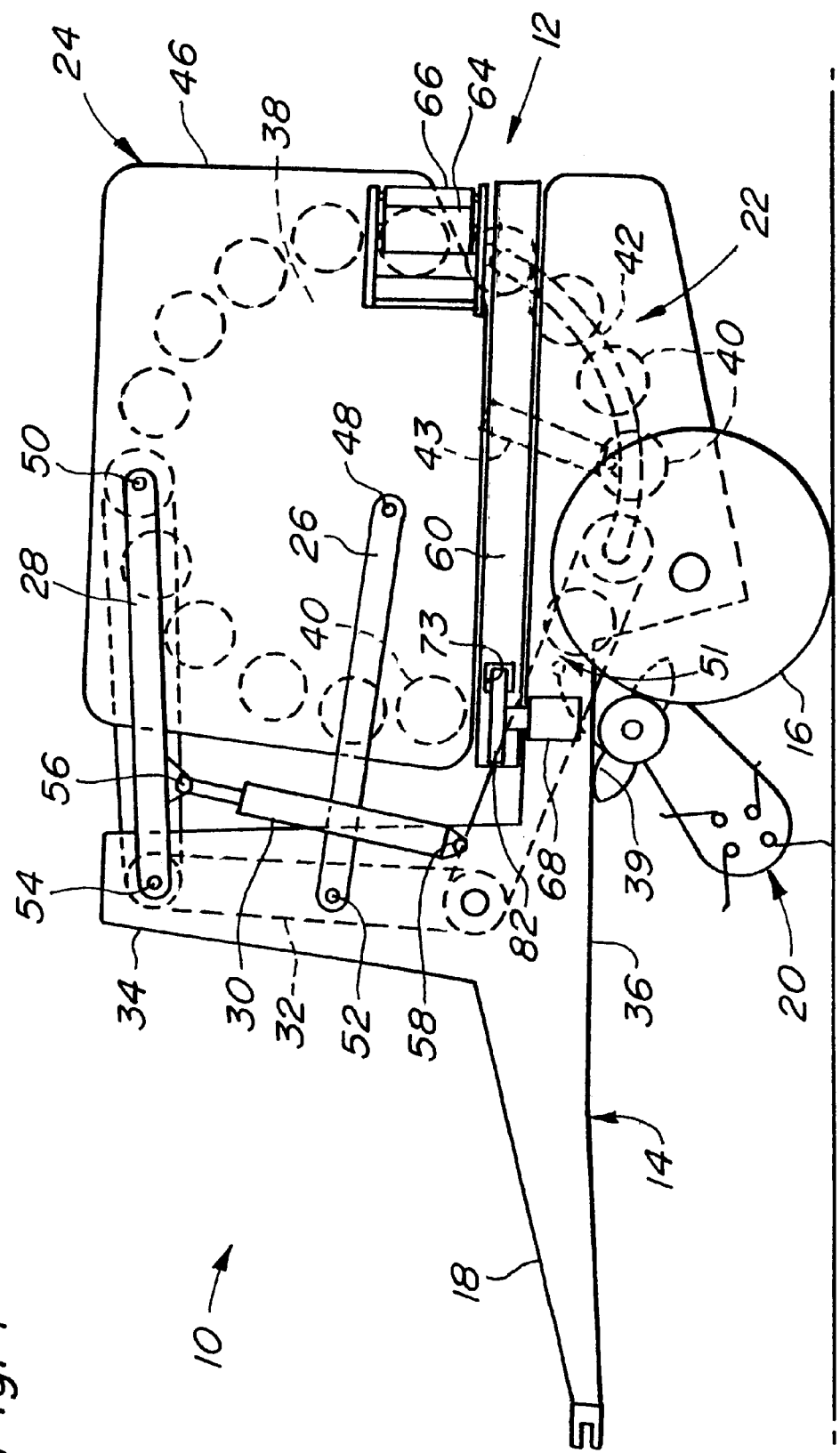
FIG. 1 is a somewhat schematic left side elevational view of an integrated large round baler and bale wrapping device constructed in accordance with the principles of the present invention and shown in a condition for taking up and baling crop material.
Figure 2:
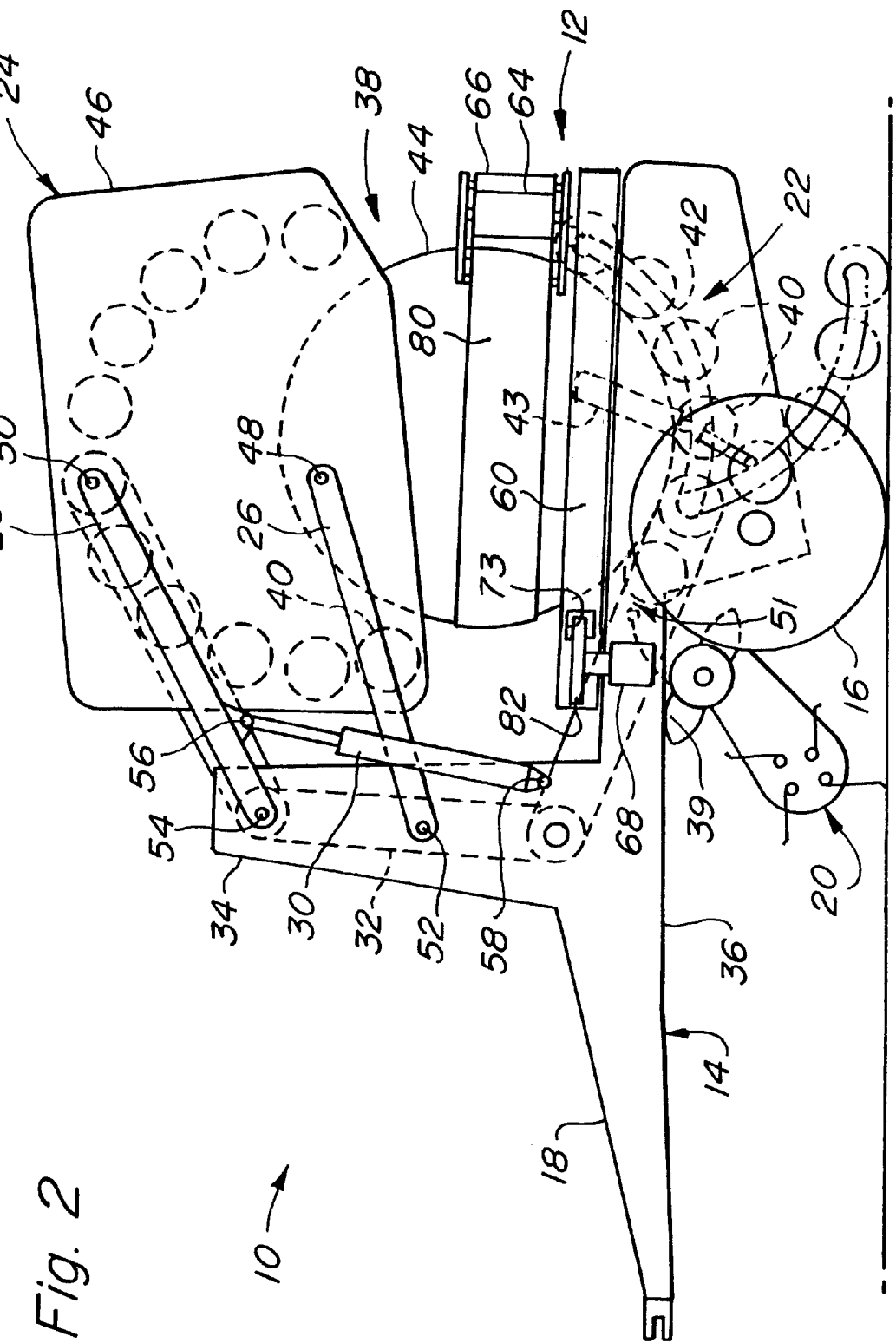
FIG. 2 is a view like FIG. 1, but showing the integrated large round baler and bale wrapping device in a condition for permitting a formed bale to be wrapped, and showing a lower rear portion of the bale-forming rolls in broken lines in a lowered bale discharge position.

Referring now to FIGS. 1 and 2, there is shown a baler 10 together with a wrapping arrangement or device 12.

The baler 10 includes a frame 14, ground wheels 16, a towbar or draft tongue 18, a crop intake arrangement or pickup 20, a lower housing section 22, an upper housing section 24, a lower pair of guide arms 26, an upper pair of guide arms 28, a positioning arrangement 30 and a drive 32.

In this embodiment, the baler 10 is configured as a large round baler that can produce a cylindrical bale and subsequently wrap it with plastic foil or sheeting or the like. The baler 10 is configured with a constant or fixed volume baling chamber; but it could also be configured so that the volume is variable. The baler 10 is employed for the baling of crop lying on the ground, such as straw, hay silage or the like and for this purpose it is moved across a field by a vehicle. Alternatively, the baler 10 could also be operated as a stationary device in an industrial enterprise, in order to bale and wrap, for example, refuse, cloth, paper or similar industrial products.

The frame 14 is configured as a weldment and contains a wide mast 34 or two or more masts 34 spaced transversely from one another, and longitudinal carriers 36, that extend in the direction of operation and generally in an extension of the towbar 18. The wheels 16 are attached either individually or by means of an axle, rigidly or mounted on springs, to the longitudinal carriers 36 of the frame 14, and support the baler 10. The towbar 18 is either rigidly connected to the frame 14 or connected for vertical adjustment and forms the connection to a vehicle, such as an agricultural tractor, for example, which is not shown.

The crop intake arrangement 20 is configured and arranged conventionally. As known from conventional so-called pickups, a multitude of flexible tines are provided that can rotate clockwise, as shown in the drawings, that collect the crop from the ground and conduct it to a baling chamber 38, defined by the lower and upper housing sections 22 and 24, respectively. The conveyor arrangement of the crop intake arrangement 20 is directed relatively steeply upward, particularly behind the flexible tines. Downstream of the crop intake arrangement 20 an intermediate conveyor 39 and/or a chopper may be provided as is also known in practice.

The lower housing section 22 includes several rolls 40 that are formed from steel and are supported in bearings, free to rotate, with their axial end regions in curved cheeks 42. The inner circumferential edges of the rolls 40 are located on a circular arc so that together with corresponding rolls 40 of the upper housing section 24 a cylindrical baling chamber 38 results with a generally circular cross section.

The cheeks 42 are also formed from steel and are connected to each other by struts, not shown, in order to attain a structure that is strong against bending and torsion. The cheeks 42 are supported in bearings, so as to pivot vertically, in the region of the second roll 40 from the front in the longitudinal carriers 36 and can be moved between the positions shown in FIGS. 1 and 2. For this purpose, a remotely controlled servo motor 43, such as a hydraulic cylinder, for example, is provided. During the formation of a bale 44 (FIG. 2), the bale is supported on the rolls 40 of the lower housing section 22, with it being noted that when the portion of the cheeks 42 carrying the rear four rolls is pivoted downward from the closed position, shown in FIG. 1, to the discharge position shown in broken lines in FIG. 2, the bale 44 will be deposited on the ground.

The upper housing section 24 is provided with eleven rolls 40, that follow the same circular line as the rolls 40 in the lower housing section and are supported, free to rotate, in opposite side walls 46. The side walls 46 enclose the sides of the baling chamber 38 and prevent the escape of crop. Respectively provided in a fore-and-aft center location of lower and upper edge regions of the side walls 46, are lower and upper bearings 48 and 50, that are formed, for example, from outwardly directed journals, pins, joints or the like. In the preferred embodiment, the upper bearing 50 is the continuation of a shaft of one of the rolls 40, in this case the sixth roll from the front. In the rear region of the lower and upper housing sections 22 and 24, located on the right in FIGS. 1 and 2, each of the end rolls 40 is arranged to each other as are the remaining rolls 40, whereas they are spaced at a distance to each other in the forward region, that corresponds to the space occupied by at least one of the rolls 40 and forms an inlet 51 for crop arriving from the crop intake arrangement 20.

On the upper housing section 24, a twine or a net wrapping arrangement, not shown, is provided, that is known in itself. In addition, or alternatively, a plastic sheet or foil wrapping arrangement could also be provided, that applies the sheet to the circumferential surface of the bale 44. The line of separation between the lower and the upper housing sections 22 and 24, as viewed from the side, is nearly horizontal.

The lower guide arms 26 each extend between a lower bearing 52 provided on the mast 34 and the lower bearing 48 provided on a respective side of the upper housing section 24, with the arm 26 being free to rotate vertically at both bearings. With respect to the horizontal and as considered from front to rear, the lower guide arm 26, as positioned in FIG. 1, extends at a slight inclination downward, while in the position according to FIG. 2, it extends at a slight inclination upward.

The upper guide arms 28 each extend between an upper bearing 54 on the mast 34 and the upper bearing 50 on a respective side of the upper housing section 24, and like the lower guide arms, are supported in or on both bearings so as to be free to pivot vertically. In the position according to FIG. 1, the guide arm 28 extends generally horizontally. Provided between its ends and in the region outside the front of the upper housing section 24, each upper steering arm 28 is provided with a connection 56, that may, for example, be a joint with a pin or the like.

After all that, in the embodiment shown, the guide arms 26 and 28 do not extend parallel to each other; this would, however be possible. Although, in the foregoing in each case only one lower and one upper guide arm 26 and 28 is illustrated, it is to be understood that such guide arms are provided on both sides of the housing section, although this is not an absolute requirement since single bifurcated arms could be provided where the bifurcated portion of each arm straddles, and is pivotally mounted to, the housing section 24 with the remaining portion of the arm being pivotally mounted to the mast 34.

The positioning arrangement 30 is formed in this embodiment by a pair of hydraulic servo motors, so-called hydraulic cylinders, each of which extends generally vertically between and has respective end regions coupled to a respective one of the connections 56 and of bearings 58 at the foot of the mast 34. Nevertheless, other configurations would be possible, particularly with only one servo motor. The positioning arrangement 30 is supplied by means of a control or regulating arrangement, not shown, with hydraulic fluid in a direction and can thereby be extended in order to vertically reposition the upper guide arm 28 and, through the connection with the upper housing section 24, also the lower guide arm 26. The operation of the control or regulating arrangement is performed either as a function of sensors or manually by an operator seated in the vehicle.

The drive 32 is shown in the drawing only very schematically essentially as an encompassing drive, here several encompassing drives are driven from the vehicle, in each case by means not shown, through an articulated shaft, a gearbox and various shafts. Generally, a drive of the lower and upper rolls 40, the crop intake arrangement 20 and if necessary, the wrapping arrangement 12 is required.

According to the description so far, the guide arms 26 and 28 form, along with the upper housing section 24 and the mast 34, a four-bar linkage which is essentially a parallelogram. As a result of the loading on the position arrangement 30, this parallelogram can be repositioned upward or downward; accordingly the upper housing section 24 assumes a lower baling position, that shown in FIG. 1, or an upper discharge position, that shown in FIG. 2, in which a wrapping process, described in the following can be performed. As can be seen, in particular in FIG. 2, in the raised position of the upper housing section 24, the baler 10 extends to only slightly greater height, so that the center of gravity of the baler is not shifted upward to a significant degree. The raising is performed only in so far as is necessary for the performance of the wrapping process.

The lower housing section 22 can also assume an upper position, that shown in FIG. 1, in which the bale 44 is formed, and in solid lines in FIG. 2, in which the bale 44 can be completely wrapped in plastic, and in dashed lines in FIG. 2, in which the bale 44 can be unloaded from the baling chamber 38.

Referring now also to FIG. 3, it can be seen that the wrapping arrangement 12 includes a ring-like guide track 60, a ring-like slide 62, a wrapping material carrier 64, a braking and separating arrangement 66 and track drive motors 68. The wrapping arrangement 12 is used for the complete wrapping of the bale 44 with plastic sheet or foil, capable of being stretched, and is employed when the crop is silage forage, that must be enclosed in an air-tight wrapping. Obviously, the application of the wrapping arrangement 12 is not limited to this type of foil. For example, a net or other types of foil or paper or the like could be employed in order to enclose the bale 44.

The guide track 60 is so configured that it forms approximately 75% of a uniformly curved, closed circle, that can enclose the bale 44 when formed to its largest diameter. The guide track 60 is arranged horizontally, in particular, at the plane of separation between the lower and upper housing sections 22 and 24, respectively. An opening 70 of the guide track 60 is located symmetrically about the longitudinal centerline of the baler 10 at its rear region, so that a bale 44 tilted to the rear and downward from the lower housing section 22 can be deposited through the opening 70 onto the ground. According to an alternative embodiment, not shown, a section of the guide track 60 that corresponds to the size of the opening 70 is attached to the rear end region of the lower housing section 22, and is aligned with the remaining guide track 60, so that a more or less closed circle or ring is formed. If necessary, guides or locking devices could be provided at the ends of each of the sections of the guide track 60 that face each other, that result in a complete, closed guide track 60. In the absence of such a supplementary section of the guide track 60, lead-in openings or enlarged regions could be provided at their ends.

The guide track 60 is bent from a C-channel defining a slot 72 at one side, which can best be seen in FIGS. 4 and 5. Furthermore, in the region of each of the motors 68, an elongate opening 73 (see FIGS. 1 and 2) is provided in the outer surface of the guide track 60 for a purpose explained below. The guide track 60 is erected and securely retained on the longitudinal carrier 36 by carriers, struts, retainers and the like.

The slide 62 is constructed of a flat band of material having essentially the same length and curved form as the guide track 60 and is located in its interior. To reduce friction, horizontal and vertical rollers 74 and 75, respectively, are provided that support the slide 62 against horizontal or vertical forces. The outer surface of the slide 62 is provided with a rack of gear teeth 76. In a slide 62 made from steel, the gear tooth profile can be formed into it, it can be mounted on it by means of a flexible rack made of plastic, or formed by a row of perforations or openings provided in the slide 62. In the case that the loading permits, the slide 62 can also be formed from a high-strength or reinforced plastic. In the region of the wrapping material carrier 64 and the braking and separating arrangement 66, the slide 62 is provided with a carrier 78 projecting outward horizontally at a level for passing through the channel slot 72. The slide 62 is supported in bearings and dimensioned in such a way that it can be moved within the guide track 60.

The wrapping material carrier 64 is supported in bearings, free to rotate, on the carrier 78 and contains a roll, not described in any further detail, with foil, for example, plastic sheet that can be stretched. The roll of foil 80 is oriented vertically so as to dispense in the horizontal direction without causing any twists in the foil.

The braking and foil severing or separating arrangement 66 is arranged to assure that the foil 80 is stretched during its application to the bale 44 and is applied air-tight to the bale 44 and/or to a previously wrapped length of underlying foil 80 to which it adheres. The braking and separating arrangement 66 also performs a separation, either by cutting or tearing, after the wrapping process. An applicator or retainer that would retain the foil 80 on the bale 44 or the frame 14 at the start of the wrapping process is not shown, since these are commercially available and known. In an alternative embodiment, not shown, several wrapping material carriers 64 and braking and separating arrangements 66 could be employed.

The motors 68 are configured as hydraulic motors, but they could also be electric motors. The motors 68 are located at a forward region of the guide track 60 and, thus, are opposite the opening 70, in particular within the outer width of the machine determined by the guide track 60. Each motor 68 is equipped with a gear 82 that can be driven in the direction indicated by the arrows. As can be seen in FIGS. 1, 2 and 5, each gear 82 extends through the adjacent elongate opening 73 in the guide track 60 and is in constant mesh with the rack of teeth 76 provided on the slide 62. The gear 82 engages the tooth profile 76 in such a way that there can be no collision with the carrier 78 or the components carried by the latter during movement of the slide 62. In place of two motors 68, one motor or more than two motors 68 could be employed. Furthermore, the motors 68 could also engage the inward side of the slide 62 provided that the tooth profile 76 is also located on the inward side of the slide 62.

After that description, the wrapping arrangement 12 operates as follows.

When the motors 68 are driven, they move the slide 62 within the guide track 60 in a horizontal plane. As soon as one end of the slide 62 leaves the guide track 60, it crosses the opening 70 and again enters the guide track 60 at the following end region. In this way, the slide 62 and with it the wrapping material carrier 64 and the braking and separating arrangement 66 can perform a circulating movement.

For the wrapping process, according to FIG. 2, the upper housing section 24 is raised to such a point that the wrapping material carrier 64 can circulate around the bale 44 without colliding with the upper housing section 24. In order to attain an offset of the foil 80 (FIG. 2) on the surface of the bale 44, the rolls 40 of the lower housing section 22 are driven slowly and thereby the bale 44 is brought into rotation. The wrapping process is continued for such a period of time until the bale 44 is adequately enclosed in an air-tight envelope. For this purpose, four layers are conventionally required. As soon as the wrapping process is completed, the foil 80 is separated by means of the braking and separating arrangement 66 and the slide 62 is moved into a position in which its ends come to rest within the guide track 60 and the opening 70 is free. Subsequently, the bale 44 is tilted through the opening 70 by extension of the hydraulic motors 43 to effect a vertical downward pivoting movement of the cheeks 42 carrying the lower rear bale-forming rolls 40 of the lower housing section 22. Finally, the lower housing section 22 is raised and the upper housing section 24 is lowered until the baling chamber 38 is again closed.

Although not described, the lower housing section 22 with the rolls 40 could also be constructed as a turntable which rotates about a vertical axis while the wrapping material carrier 64 remains in a fixed position.

What is claimed is:

1. In a large round baler including a support frame, a baling chamber defined by upper and lower housing sections which meet at a substantially horizontal plane when the baler is in a condition for forming a bale, and a guide structure coupled between said support frame and said upper housing section and including a powered actuator for elevating said upper housing section away from said lower housing section, the improvement comprising: said support frame including an upright mast extending in front of said upper housing section; said guide structure including upper and lower generally parallel guide arms pivotally coupled between said upper housing section and said mast such that substantially all of said upper housing section moves vertically the same amount so that a gap of substantially constant height above said plane exists between said upper and lower housing sections when said powered actuator is actuated to elevate said upper housing section.

2. In a large round baler including a support frame, a baling chamber defined by upper and lower housing sections which meet at a substantially horizontal plane when the baler is in a condition for forming a bale, and a guide structure coupled between said support and said upper housing section and including a powered actuator for elevating said upper housing section away from said lower housing section, the improvement comprising: said guide structure including guide elements coupled between said upper housing section and said support frame such that substantially all of said upper housing section moves vertically the same amount so that a gap of substantially constant height above said plane exists between said upper and lower housing sections when said powered actuator is actuated to elevate said upper housing section; a wrapping arrangement provided at said horizontal plane; said wrapping arrangement including at least a fixed partially circular, substantially horizontal guide track encompassing all but a rear portion of said baling chamber and having opposite spaced ends located for defining an opening in a rear region of said baler so as to permit discharge of a formed bale between said spaced ends; said wrapping arrangement also including a wrap material carrier mounted for following said guide track for dispensing wrapping material in a generally horizontal zone between said upper and lower housing sections so as to wrap a bale when said upper housing section is elevated to expose a bale located in said bale chamber.

3. The large round baler as defined in claim 2 and further including at least one motor coupled for moving said carrier relative to said guide track.

4. The large round baler as defined in claim 2 wherein said guide track is defined by a C-channel having its open side facing inwardly towards said baling chamber and an opposite, outwardly facing closed side; a slide being mounted for movement in and along said C-channel; and said carrier being coupled to said slide.

5. The large round baler as defined in claim 4 wherein said slide has a length greater than the distance between said spaced ends of laid guide track.

6. The large round baler as defined in claim 4 wherein said slide has a length commensurate with that of said guide track; first and second motors being located adjacent said closed side of said guide track at locations spaced apart from each other a distance at least as far as the distance between said opposite ends of said guide track; said closed side of said guide track being provided with first and second horizontal elongate openings respectively located adjacent said first and second motors; first and second toothed wheels respectively being coupled for being driven about respective first and second vertical axes by said first and second motors; said first and second toothed wheels respectively extending into said first and second elongate openings; and said slide being provided with a surface configuration extending its full length and providing a drive surface in constant mesh with said first and second toothed wheels, whereby said slide is adapted for being driven along said drive track by said first and second motors.

7. The large round baler defined in claim 6 wherein said slide includes a plurality of rollers spaced along its length and located in said guide track C-channel.

* * * * *